United States Patent
Backes et al.

(10) Patent No.: US 7,522,096 B2
(45) Date of Patent: Apr. 21, 2009

(54) METHOD FOR PHASE CALIBRATING ANTENNAS IN A RADAR SYSTEM

(75) Inventors: Glen B. Backes, Maple Grove, MN (US); Timothy J. Reilly, Plymouth, MN (US)

(73) Assignee: Honeywell International Inc, Morristown, NJ (US)

( * ) Notice: Subject to any disclaimer, the term of this patent is extended or adjusted under 35 U.S.C. 154(b) by 235 days.

(21) Appl. No.: 11/697,970

(22) Filed: Apr. 9, 2007

(65) Prior Publication Data

US 2008/0246649 A1 Oct. 9, 2008

(51) Int. Cl.
G01S 7/40 (2006.01)

(52) U.S. Cl. .................. 342/173; 342/174; 342/81; 342/25 C; 342/165

(58) Field of Classification Search ............... 342/25 R, 342/25 A–25 F, 81, 165, 173, 174
See application file for complete search history.

(56) References Cited

U.S. PATENT DOCUMENTS

| | | | | |
|---|---|---|---|---|
| 4,949,090 | A * | 8/1990 | Tamii et al. ................ | 342/173 |
| 5,253,188 | A * | 10/1993 | Lee et al. ................... | 702/183 |
| 5,559,519 | A * | 9/1996 | Fenner ....................... | 342/174 |
| 5,682,165 | A * | 10/1997 | Lewis et al. ................ | 342/174 |
| 5,977,930 | A * | 11/1999 | Fischer et al. ............. | 343/853 |
| 6,127,966 | A * | 10/2000 | Erhage ....................... | 342/174 |
| 6,208,287 | B1 * | 3/2001 | Sikina et al. ............... | 342/174 |
| 6,466,160 | B2 * | 10/2002 | Rexberg ..................... | 342/174 |
| 7,161,530 | B2 * | 1/2007 | Christian et al. .......... | 342/174 |
| 7,248,209 | B2 * | 7/2007 | Shima et al. ............... | 342/173 |
| 7,408,507 | B1 * | 8/2008 | Paek et al. .................. | 342/368 |
| 2003/0030582 | A1 * | 2/2003 | Vickers ....................... | 342/54 |
| 2006/0017609 | A1 * | 1/2006 | Hager et al. ............... | 342/174 |
| 2006/0227040 | A1 * | 10/2006 | Christian et al. .......... | 342/174 |
| 2008/0246649 | A1 * | 10/2008 | Backes et al. .............. | 342/165 |

FOREIGN PATENT DOCUMENTS

| | | |
|---|---|---|
| EP | 0473082 | 3/1992 |
| EP | 1376152 | 1/2004 |
| EP | 1394563 | 3/2004 |
| JP | 08015420 | 1/1996 |

OTHER PUBLICATIONS

European Patent Office, "European Search Report", Jun. 25, 2008, Published in: EP.

* cited by examiner

Primary Examiner—John B Sotomayor
(74) Attorney, Agent, or Firm—Fogg & Powers LLC

(57) ABSTRACT

A method for phase calibrating antennas in a radar system is disclosed. The method comprises providing a transmit antenna and two or more receive antennas, the receive antennas each in communication with a respective receiver channel. A radio frequency pulse having a leakage pulse is transmitted from the transmit antenna. The leakage pulse is received at each of the receive antennas and respective receiver channel. The relative phase change between the receive antennas is determined by using the leakage pulse as a reference signal.

20 Claims, 2 Drawing Sheets

METHOD FOR PHASE CALIBRATING ANTENNAS IN A RADAR SYSTEM

BACKGROUND

Interferometric Synthetic Aperture Radar (ISAR) is a pulse radar system that enables the ability for wide area mapping at high resolutions for numerous applications, including military systems, earth-mapping, and environmental resource mapping. This mapping typically requires transmission of a radio frequency (RF) pulse from a single antenna, and reception of the reflected pulse into two or more antennas at a known antenna-to-antenna spacing. The phase difference of the received pulse in each of the receiving antennas is used to determine a cross-track vector. The accuracy of the ISAR system is directly related to this cross-track vector.

Components in an electronic RF system such as ISAR have an electrical phase dependency on temperature. Uncalibrated differences between receive channels results in electrical phase error over temperature, therefore decreasing ISAR accuracy. Thus, accurate phase calibration over temperature is required for proper system performance.

It is conceptually possible to phase calibrate an ISAR system over temperature by injecting a planar wavefront (to simulate a distant reflected target) into the antennas and measuring the phase differences. Such a calibration, however, would need to take place in a relatively large RF anechoic chamber, which is designed to suppress reflected RF signals. Implementing the extreme temperature variations required for calibration would not be feasible, since phase calibration in an anechoic chamber is feasible only at room temperature and nominal environmental conditions.

SUMMARY

The present invention relates to a method for phase calibrating antennas in a radar system. The method comprises providing a transmit antenna and two or more receive antennas, the receive antennas each in communication with a respective receiver channel. A radio frequency pulse having a leakage pulse is transmitted from the transmit antenna. The leakage pulse is received at each of the receive antennas and respective receiver channel. The relative phase change between the receive antennas is determined by using the leakage pulse as a reference signal.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
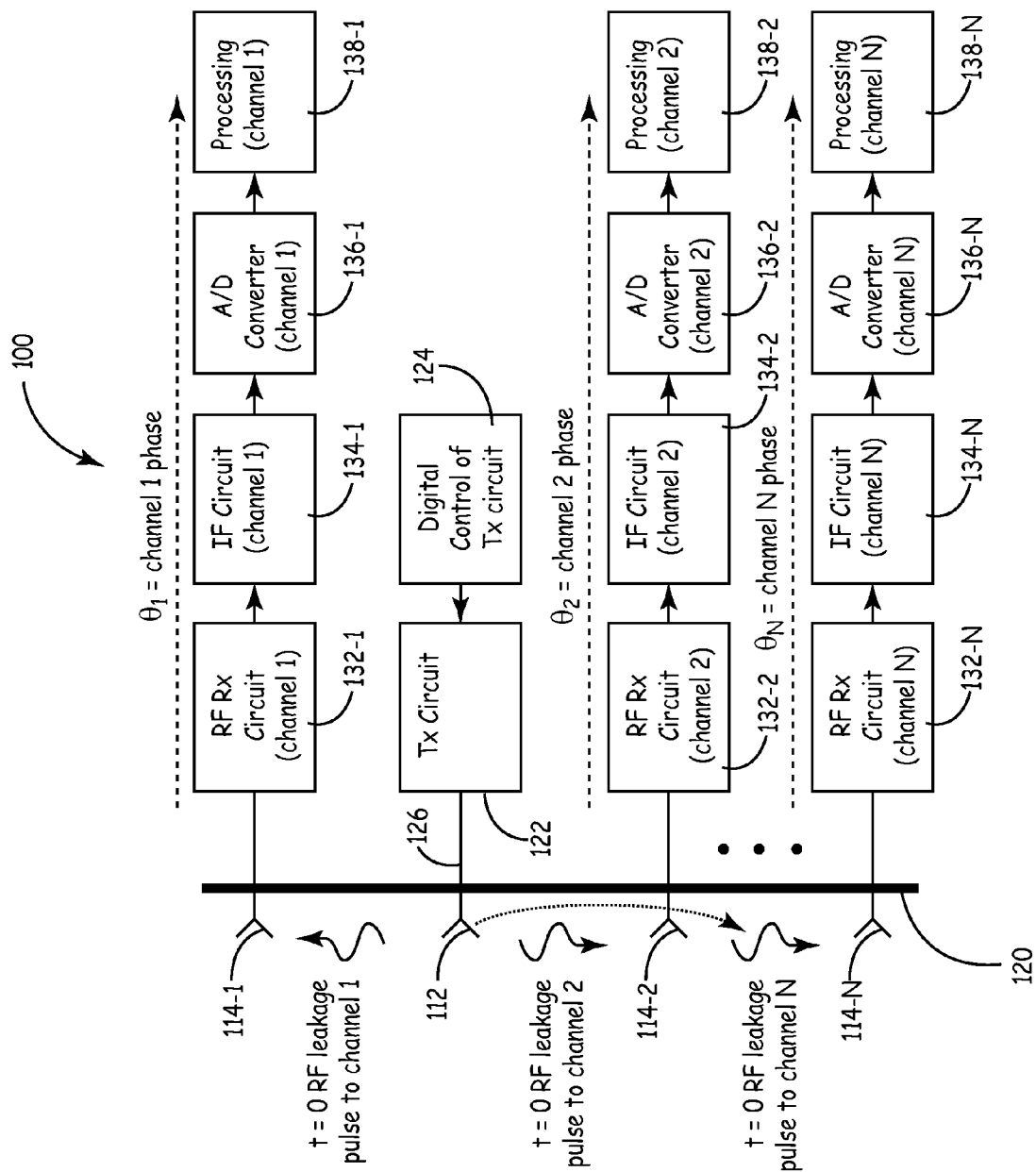
FIG. 1 illustrates a schematic configuration of a pulsed radar system that can implement a method for phase calibrating a system of antennas.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The invention is directed to a method for phase calibrating antennas in a radar system. The present method can be used to make in-flight, periodic phase corrections to a multi-antenna receiver for a radar system on an aircraft. There is a need to periodically perform an in-flight phase calibration to account for the phase variation between receive channels as environmental conditions change during flight, including temperature. The method described herein utilizes the RF leakage pulse from the transmit antenna to the receive antennas as a reference signal in which to measure the relative phase change between receive antennas.

The present method takes periodic phase measurements in-flight using a time (t)=0 leakage pulse to calibrate the antennas. Since the antennas and receiver electronics have a rather large phase variation over temperature (a physically large antenna feed network and electrically long receiver electronics results in large phase variation over temperature), periodic phase corrections are needed.

In one aspect of the invention, the method can be used to phase calibrate an ISAR system real-time during a flight mission, thereby eliminating the need to phase calibrate over temperature during production. The method of the invention does not eliminate the room temperature calibration step in an anechoic chamber, but it does provide for phase calibration in-flight when the system is subject to varying temperatures. The in-flight calibration creates offset correction factors from the reference room temperature calibration that was performed in an anechoic chamber during production of the radar system.

Typical RF receiver components in an ISAR system include an antenna, coaxial cable, RF amplifiers, RF to intermediate frequency (IF) downconverters, and IF amplifiers. All of these components have an electrical phase dependency with temperature.

An ISAR system may utilize return Doppler shift when receiving the signal for phase comparison; however, the t=0 leakage pulse is always zero Doppler shifted. This allows frequency discrimination of the leakage pulse for use as a calibration signal, even down to low altitudes when the ground return signal is close in time to the leakage pulse. Any filtering needs to be temporarily and dynamically adjusted to receive a zero Doppler shifted signal for use as a calibration signal.

The processing electronics and software of the ISAR system are configured to accommodate the measurement of the t=0 leakage pulse for phase corrections. The amount of leakage from the transmit antenna to the receive antennas will vary from unit to unit. Each radar unit is configured to be measured for t=0 leakage amplitude, and automatic gain control (AGC) circuits adjust the gain of the receive IF stage to proper levels for the analog to digital conversion.

Although the present method is described with respect to pulsed radar systems, the present method can be adapted for use in other radar systems, such as frequency modulated continuous wave (FMCW) radar.

FIG. 1 illustrates a schematic configuration of a pulsed radar system 100 that can implement the method of the invention. The radar system 100 has an antenna array including a transmit antenna 112. Although three receive antennas are shown in FIG. 1, it should be understood that two or more receive antennas 114-1, 114-2, . . . 114-N can be utilized.

The transmit antenna 112 can be secured to an aircraft body 120 of arbitrary shape and is in electrical communication with a transmit (Tx) circuit 122, which in turn communicates with a digital controller 124. The receive antennas 114-1, 114-2, . . . 114-N are secured to aircraft body 120 and are each in electrical communication with corresponding RF receive (Rx) circuits 132-1, 132-2, . . . 132-N through channels 1, 2, . . . N, respectively. The Rx circuits each communicate with corresponding IF circuits 134-1, 134-2, . . . 134-N. The IF circuits each communicate with corresponding analog-to-digital (A/D) converters 136-1, 136-2, . . . 136-N, which in turn communicate with corresponding processing units 138-1, 138-2, . . . 138-N.

During operation of pulsed radar system 100, digital timing circuits in digital controller 124 control a switch in the RF path, creating a transmitted pulse shape. This RF pulse is amplified in Tx circuit 122 and sent via a transmission line 126 (e.g., a coaxial transmission line) to transmit antenna 112. The RF pulse is then transmitted to an object (e.g., earth ground) and is reflected back to the receive antennas 114-1, 114-2, . . . 114-N and corresponding channels at a time delay that is proportional to the distance to the object. The cross-track angles $\theta_1, \theta_2, \ldots \theta_N$ are determined from the spacing of the receive antennas and phase differences received from the ground return.

An unintended consequence of transmitting through the transmit antenna in close proximity to the receive antennas is a t=0 leakage pulse. While the antennas are typically designed and configured to reduce the leakage signal into the receive antennas, the high gain of the receivers unintentionally amplifies the signal to a measurable level. The method of the invention utilizes this unintentional t=0 leakage pulse in an intentional manner during flight, to periodically measure the phase changes between receiver channels (e.g., electrical path length over temperature for each channel) with respect to the relative reference room temperature calibration values and uses these phase deltas as phase corrections. These phase corrections are relative to room temperature phase measurements, which are measured in an anechoic chamber under nominal environmental conditions during production of the radar system.

Figure 2:
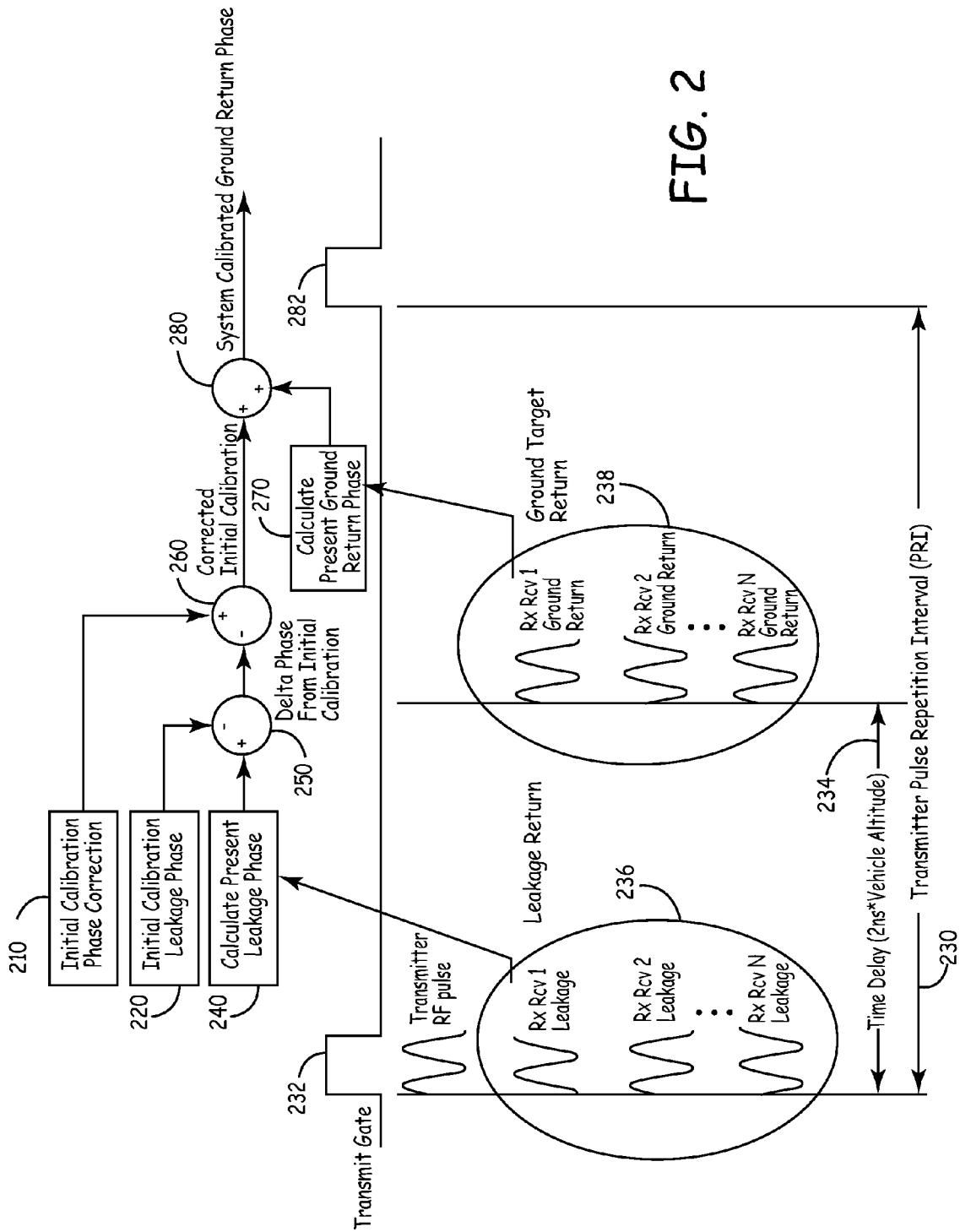
FIG. 2 is a process flow and timing diagram representing a method for phase calibrating a system of antennas in a radar system.

For example, FIG. 2 is a process flow and timing diagram depicting the method for phase calibrating that can be used in the radar system. The radar system is initially calibrated during production at room temperature and nominal environmental conditions to determine an initial calibration phase correction (block 210) and an initial calibration leakage phase (block 220) for each receive antenna, which are stored in a memory unit of the radar system.

While operating the radar system during the flight of an aircraft, the relative phase of the receiver channels changes over temperature. The present method utilizes the t=0 leakage pulse to periodically measure the relative phase changes between receiver channels during a transmitter pulse repetition interval (PRI) 230. During a transmit gate 232, the transmitter sends an RF pulse having a leakage pulse 236 that is received by each receive antenna and measured in each receiver channel (e.g., Rx Rcv 1, 2, . . . N). A present leakage phase for each receiver channel is calculated (block 240) from the measured leakage pulse. The present leakage phase (240) for each channel is offset from the initial calibration leakage phase (220) to obtain the delta phase from initial calibration for each channel at 250. As indicated in FIG. 2, the delta phase from initial calibration (250) is then offset from the initial calibration phase correction (210) to obtain a corrected initial calibration at 260 for each receiver channel.

After a time delay 234 (equal to 2 ns*vehicle altitude), a present ground return phase for each receiver channel is calculated (block 270) from a ground target return signal 238 received by each receive antenna and corresponding receiver channels (e.g., Rx Rcv 1, 2, . . . N). The corrected initial calibration (260) is combined with the ground return phase (270) to obtain a system calibrated ground return phase at 280 for each receiver channel, which provides the corrected phase value that is used in further processing of data such as to determine cross-track angles. The method shown in FIG. 2 can be periodically repeated at different intervals, such as at a subsequent transmit gate 282.

The periodic repetition of the present method can be done for every transmit gate or at other predetermined intervals. For example, an automated timer can be utilized at predetermined intervals to implement the method. Alternatively, one or more thermocouples can be employed to control how often the leakage pulse is measured such that when the temperature deviates by a certain amount, the method is automatically initiated.

Instructions for carrying out the various process tasks, calculations, and generation of signals and other data used in the operation of the methods and systems of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, etc. that perform particular tasks or implement particular abstract data types. These represent examples of program code means for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for phase calibrating antennas in a radar system, the method comprising:
   (a) providing a transmit antenna and two or more receive antennas, the receive antennas each in communication with a respective receiver channel;
   (b) transmitting a radio frequency pulse having a leakage pulse from the transmit antenna;
   (c) receiving the leakage pulse at each of the receive antennas and the respective receiver channel; and
   (d) determining the relative phase change between the receive antennas by using the leakage pulse as a reference signal.

2. The method of claim 1, wherein the radar system comprises a pulsed radar system.

3. The method of claim 1, wherein the transmit and receive antennas are secured to an aircraft.

4. The method of claim 3, wherein steps (b) through (d) take place during a transmitter pulse repetition interval while the aircraft is in flight.

5. A method for phase calibrating antennas in a radar system, the method comprising:
   (a) providing a transmit antenna and two or more receive antennas, the receive antennas each in communication with a respective receiver channel;
   (b) determining an initial calibration phase correction for each of the receive antennas;
   (c) determining an initial calibration leakage phase for each of the receive antennas;
   (d) transmitting a radio frequency pulse having a leakage pulse that is received by each receive antenna and measured in each receiver channel;
   (e) calculating a present leakage phase for each receiver channel from the leakage pulse;
   (f) offsetting the present leakage phase from the initial calibration leakage phase to obtain a delta phase from initial calibration for each receiver channel;
   (g) offsetting the delta phase from initial calibration from the initial calibration phase correction to obtain a corrected initial calibration for each receiver channel;
   (h) calculating a ground return phase for each receiver channel from a ground target return signal received by each receive antenna; and
   (i) combining the corrected initial calibration with the ground return phase to obtain a system calibrated ground return phase for each receiver channel.

6. The method of claim 5, wherein the radar system comprises a pulsed radar system.

7. The method of claim 5, wherein the transmit and receive antennas are secured to an aircraft body.

8. The method of claim 5, wherein the initial calibration phase correction and the initial calibration leakage phase are stored in a memory unit of the radar system.

9. The method of claim 5, wherein the initial calibration phase correction and the initial calibration leakage phase are determined at room temperature and nominal environmental conditions.

10. The method of claim 5, wherein the radio frequency pulse is transmitted during a transmit gate of a transmitter pulse repetition interval.

11. The method of claim 10, wherein steps (d) through (i) take place during the transmitter pulse repetition interval while an aircraft is in flight.

12. The method of claim 5, wherein the system calibrated ground return phase provides a corrected phase value for each receiver channel.

13. The method of claim 12, further comprising determining a cross-track angle for each receiver channel from the corrected phase value for each receiver channel.

14. The method of claim 11, further comprising periodically repeating steps (d) through (i) to measure relative phase changes between each receiver channel during one or more subsequent transmitter pulse repetition intervals.

15. A computer readable medium having instructions stored thereon for a method for phase calibrating antennas in a radar system, the method comprising:
   (a) determining an initial calibration phase correction and an initial calibration leakage phase for each of two or more receive antennas, the receive antennas each in communication with a respective receiver channel;
   (b) calculating a present leakage phase for each receiver channel from a leakage pulse received by each receive antenna from a transmitted radio frequency pulse;
   (c) offsetting the present leakage phase from the initial calibration leakage phase to obtain a delta phase from initial calibration for each receiver channel;
   (d) offsetting the delta phase from initial calibration from the initial calibration phase correction to obtain a corrected initial calibration for each receiver channel;
   (e) calculating a ground return phase for each receiver channel from a ground target return signal received by each receive antenna; and
   (f) combining the corrected initial calibration with the ground return phase to obtain a system calibrated ground return phase for each receiver channel.

16. The computer readable medium of claim 15, wherein the initial calibration phase correction and the initial calibration leakage phase are determined at room temperature and nominal environmental conditions.

17. The computer readable medium of claim 15, wherein the radio frequency pulse is transmitted during a transmit gate of a transmitter pulse repetition interval.

18. The computer readable medium of claim 15, wherein the system calibrated ground return phase provides a corrected phase value for each receiver channel.

19. The computer readable medium of claim 18, wherein the method further comprises determining a cross-track angle for each receiver channel from the corrected phase value for each receiver channel.

20. The computer readable medium of claim 17, wherein the method further comprises periodically repeating steps (b) through (f) to measure relative phase changes between each receiver channel during one or more subsequent transmitter pulse repetition intervals.

* * * * *